Patented Oct. 24, 1939

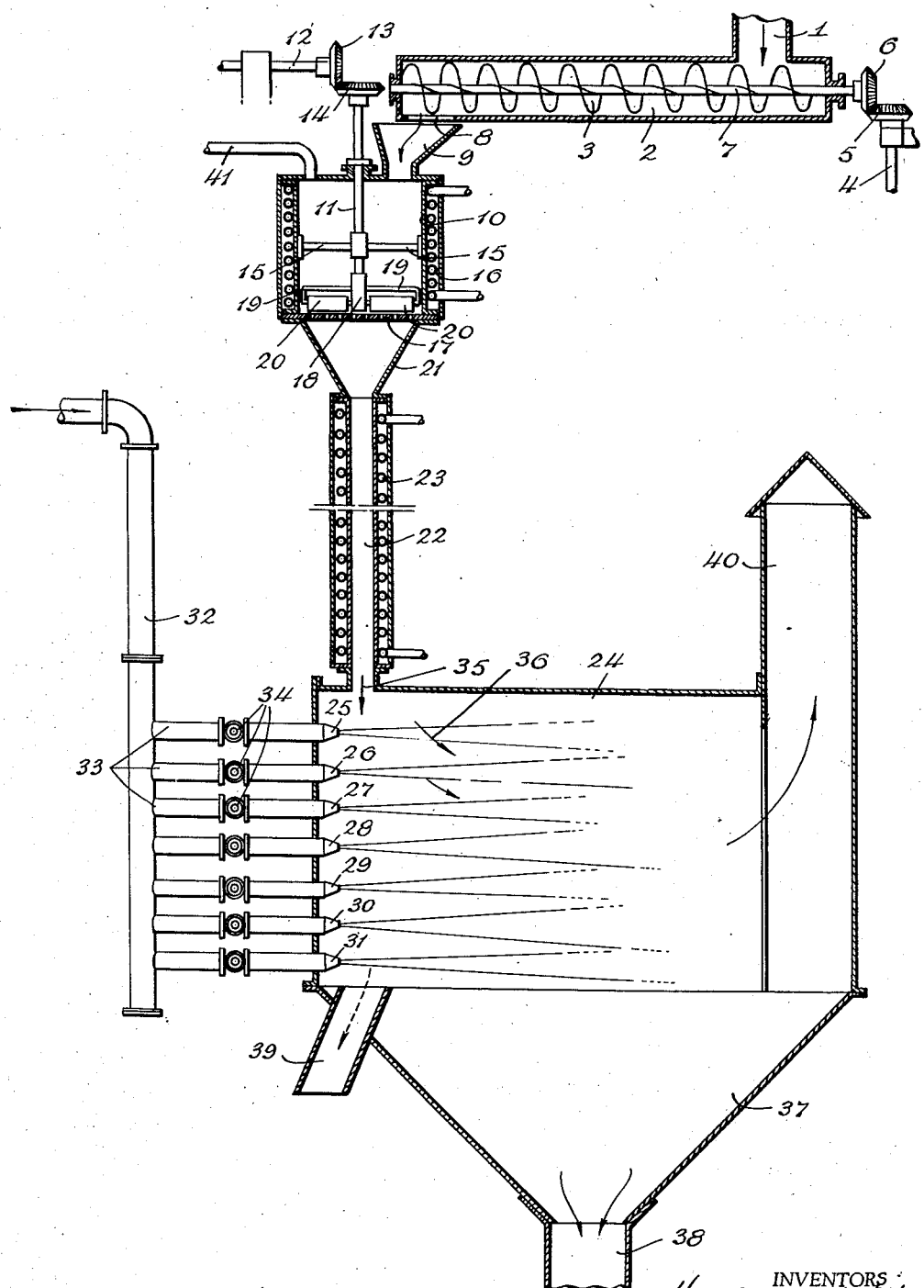

2,177,378

UNITED STATES PATENT OFFICE 2,177,378

MEANS FOR MANUFACTURING STARCH PRODUCTS

Helmut Schorn, Dillingen-Saar, and Carl Victor Daumas, Dusseldorf, Germany, assignors to N. V. "Agratherm", Amsterdam, Netherlands, a corporation of the Netherlands Application June 20, 1936, Serial No. 86,322. Renewed March 22, 1939. In Germany May 9, 1935

4 Claims. (Cl. 127—28)

This invention relates to a method and means for manufacturing starch, and refers more particularly to the manufacture of starch which has strong swelling properties.

Starch which is capable of swelling has the tendency to form lumps in cold water, and in order to produce starch which can be dissolved in cold water and stirred therein without forming lumps it was considered necessary to add certain chemicals to it which reduce the speed of swelling, or which affect the surface tension of the starch particles in such manner as to avoid the formation of lumps.

An object of the present invention is the provision of a simple and comparatively inexpensive apparatus for manufacturing starch which is capable of swelling, and which can be stirred in cold water without forming lumps.

Another object is the provision of a starch-treating method, in the course of which no chemicals are added to the starch which affect its speed of swelling or its surface tension, the starch produced by said method having strong swelling properties and being easily soluble in cold water.

The above and other objects of the present invention may be realized by consecutively bringing the starch in contact with several steam jets which are directed with a certain force against the starch particles.

Prior to this treatment the starch is preferably passed through a sieve under pressure, so that it consists of a large number of small spherical or cylindrical particles.

Water may be added to the starch to raise its moisture contents to about 45 per cent. While the amount of moisture may be varied within certain limits, care should be taken that the starch does not contain any liquid particles while it is being subjected to the action of the steam jets.

It is also advisable to heat the starch prior to the steam treatment.

The heated and moistened starch is subjected to the action of a first steam jet which strikes the starch particles with a certain force and renders some of the starch particles soluble by fusion, thereby disintegrating these particles and diminishing their specific weight. Consequently, as a result of this contact with steam, the starch is separated into particles of different weight. The lighter particles are carried away by the first steam jet, while the heavier particles are brought into contact with a second steam jet. This process is repeated several times. The steam jets are preferably arranged one over the other and extend horizontally across a reaction chamber into which the starch is dropped. The starch residue is removed and may be subjected once again to the same treatment.

The speed of movement of the particles of starch and steam should be adjusted in such manner that the period of impact between the starch and each steam jet should continue for about one second.

The finished product is a starch which has about ten per cent. moisture; it swells easily and does not form lumps when stirred in cold water.

The invention will appear more clearly from the following detailed description when taken in connection with the accompanying drawing showing a preferred embodiment of the inventive idea.

The drawing is a diagram partly in section illustrating an apparatus for treating starch.

The raw starch is introduced through a pipe 1 into a horizontal pipe 2 containing a spiral screw 3 which is driven by means of a driving shaft 4. The shaft 4 carries a gear wheel 5 meshing with the gear wheel 6 which is rotatable along with the shaft 7 of the screw 3. The raw starch within the pipe 2 is transported by the spiral screw 3 to the opening 8 formed in the pipe.

The starch falls through the opening 8 into a trough 9 and passes into the interior of a container 10. A small pipe 41 may be attached to the cover of the container 10, and may be used for supplying a predetermined amount of liquid to the starch to increase the moisture contents thereof.

A central vertical shaft 11 is situated within the container 10 and is driven by means of a shaft 12 carrying a gear wheel 13 which meshes with the gear wheel 14 mounted on the shaft 11. The shaft 11 is provided with arms 15 which rotate within the container 10 so that the starch within the container 10 is continuously stirred or agitated by the arms 15. The walls of the container 10 are preferably heated by a heating coil 16.

The bottom of the container 10 is formed by a sieve 17 which may be removed and substituted by a new one, whenever necessary. A sleeve 18 is mounted upon the lower end of the shaft 11 and is rotatable along with this shaft. The sleeve 18 carries arms 19 supporting the rollers 20 which are moved by the shaft 11 over the surface of the sieve 17.

Obviously, brushes or any other suitable means may be used in lieu of the rollers 20.

The starch which falls upon the sieve 17 is pressed through the sieve by the rollers 20 which are moved over the sieve 17 with an adjustable constant speed.

The starch particles which have passed through the sieve 17 are uniform in shape and may have a spherical or cylindrical form. These starch particles fall into the trough 21 and pass into a pipe 22 which is preferably heated by a heating coil 23.

The reaction chamber 24 is situated underneath the pipe 22. The nozzles 25 to 31 are situated one over the other in the chamber 24 adjacent the lower end of the pipe 22. The nozzles 25 to 31 are connected with the main steam pipe 32 by means of the pipes 33, each of which carries a valve 34.

Steam is conducted under pressure from any suitable source not shown in the drawing through the main pipe 32 and the pipes 33, and is ejected in the form of steam jets through the nozzles 25 to 31.

The starch drops through the tube 22 into the chamber 24 in the direction of the arrow 35 and first comes in contact with the steam jet ejected by the nozzle 25.

Some of the starch particles are disintegrated and rendered soluble by the steam jet, with the result that the specific weight of these starch particles is decreased. These particles move within the chamber 24 in the direction of the arrow 36 under the combined influence of the force of the steam jet and their own gravity until they fall into the trough 37 and are removed through the pipe 38.

Those starch particles, the specific weight of which was not diminished by the jet of steam projected through the nozzle 25, continue to drop in the direction of the arrow 35 until they meet the second jet of steam situated underneath the first jet and emitted through the nozzle 36. Then the process is again repeated, some of the starch particles being disintegrated by the steam so that they become lighter and fall into the trough 37.

The remaining starch particles are subjected to the action of the third jet of steam emitted through the nozzle 27. There again the lighter starch particles are separated from the heavier ones. At the end of the treatment the greater portion of the starch particles has been rendered less heavy by the action of the jets of steam and is collected in the trough 37. The residue which continues to move in the direction of the arrow 35, drops into the pipe 39 situated directly underneath the pipe 22 and may be reintroduced into the chamber 24 through the trough 9.

As shown in the drawing, the particles disintegrated by the first jet of steam are carried by it away from the nozzles so that although these particles are brought in contact with other jets of steam in the course of their movement across the reaction chamber 24, these subsequent jets of steam have little effect upon the disintegrated starch particles. The path of the heavy starch particles is only slightly changed by the impact with the jets of steam.

The steam projected into the chamber 24 through the nozzles 25 to 31 should be heated to a temperature of about 200° to 500° C., the temperature of the starch particles at the time of their contact with the steam being between 60° and 140° C.

It is advisable that the period of contact between each jet of steam and the starch particles situated underneath the pipe 22 should be not longer than about one second. It is possible to achieve this result by suitably varying the force with which the steam jets are ejected and the speed with which the starch falls into the chamber 24.

The steam leaves the chamber 24 through the pipe 40 which may be connected with the heating coils 16 and 23, so that the heat of the steam may be used for the preliminary heating of the starch.

Many changes may be made in the described process within the scope of the appended claims. For example, the same process may be applied to the manufacture of soluble starch products or dextrine or it may constitute a part of a process for making glues, in the course of which certain chemicals are added to the moistened starch.

The starch manufactured by the described process swells easily in cold water and may be stirred therein without forming lumps. An important advantage of this process is that no chemicals are added to the starch and that the milling and the sieving of the finished product are eliminated, since the starch collected in the trough 37 consists of small particles of uniform size.

What is claimed is:

1. An apparatus for treating starch, comprising means forming a reaction chamber, a plurality of nozzles situated within said reaction chamber one over the other, and adapted to emit jets of steam, steam pipes connected with said nozzles, valves carried by said steam pipes, means for introducing starch particles into said reaction chamber and in the path of jets of steam emitted by said nozzles, the last-mentioned means being connected with the upper portion of said reaction chamber and being situated at that end of the reaction chamber wherein said nozzles are situated, whereby the starch particles are caused to drop through the reaction chamber and past said nozzles, the specific weight of some of said starch particles being diminished by the action of the jet of steam, the lighter starch particles being carried away by the jets of steam, and a pipe connected with the bottom portion of said reaction chamber and situated directly underneath the last-mentioned means to remove the starch particles, the specific weight of which has not been diminished after contact with the steam jets.

2. An apparatus for treating starch, comprising means forming a reaction chamber, a plurality of nozzles situated within said reaction chamber one over the other, and adapted to emit jets of steam, means connected with the first-mentioned means for introducing starch particles into said reaction chamber and in the path of jets of steam emitted by said nozzles, the specific weight of some of said starch particles being diminished by the action of the jets of steam, the lighter starch particles being carried by said jets of steam away from said nozzles, and means connected with said reaction chamber for separately collecting the lighter starch particles and the heavier starch particles.

3. The method of treating starch, which comprises moistening starch to cause it to contain between 36% and 45% of water, comminuting and sieving the moistened starch to form a plurality of starch particles, and subjecting the starch particles to the action of a plurality of jets of superheated steam for a comparatively short time to diminish the specific weight of some of the starch particles and to separate by the force of said jets those starch particles the specific weight of which has been diminished by the action of said steam jets from the remaining starch particles.

4. The method of treating starch, which comprises moistening starch, comminuting and sieving the moistened starch to form a plurality of starch particles, and subjecting the starch particles to the action of a plurality of jets of superheated steam having a temperature ranging between 200° C. and 500° C. for a comparatively short time to diminish the specific weight of some of the starch particles and to separate by the force of said jets those starch particles the specific weight of which has been diminished by the action of said steam jets from the remaining starch particles.

HELMUT SCHORN.
CARL VICTOR DAUMAS.